Patented May 2, 1939

2,156,803

UNITED STATES PATENT OFFICE 2,156,803

LUBRICANT

Hugh S. Cooper, Shaker Heights, and Vivian R. Damerell, Cleveland, Ohio, assignors to Cooper Products, Inc., Cleveland, Ohio, a corporation of Ohio No Drawing. Application May 3, 1934, Serial No. 723,794

2 Claims. (Cl. 87—9)

The present invention relates to lubricants, and more particularly to solid materials which may be added to oils and greases to improve their lubricating properties, and also to oils and greases so treated.

An object of the present invention is the provision of a novel solid material which may be added to oils and greases to improve their lubricating properties.

Another object of the invention is the provision of a novel solid material which when added to oils and greases increases the film strength thereof, coats the rubbing or bearing surfaces and fills up the minute irregularities therein, and acts as a solid lubricant during periods when the oil or grease film breaks.

Another object of the present invention is the provision of a novel lubricant comprising a material which separates naturally and very easily into plates between which there is very little friction along the cleavage planes, thereby reducing the friction between the rubbing or bearing surfaces.

Another object of the invention is the provision of a novel lubricant comprising a solid material preferably of colloidal dimensions which fills up the minute irregularities in the rubbing or bearing surfaces thereby increasing the effective area of the surfaces in contact, and decreasing the wear and pressure per unit of surface.

Another object of the invention is the provision of a novel lubricant comprising a solid material preferably of colloidal dimensions which coats the rubbing or bearing surfaces and acts as a lubricant during emergency periods when the oil or grease film breaks, as after a long shut-down.

Another object of the invention is the provision of a novel lubricant comprising solid material preferably of colloidal dimensions which increases the film strength of the lubricant thereby increasing the load that may be carried per unit of area and preventing the oil or grease film from readily breaking during periods of shut-down.

A small amount of a solid lubricant added to oils or greases increases their lubricating properties, and fills up the small irregularities present in the rubbing or bearing surfaces, thereby increasing the effective area of contact and decreasing the pressure and wear on the surfaces. It also builds up the lubricated surfaces, replacing the loss due to abrasion, prevents progressive abrasion, and provides lubricant at high temperatures when the oil or grease becomes thin and tends to run off. It also provides lubrication during periods of emergency when for any reason the oil or grease fails, and after periods of shut-down when the oil film is often broken. In the case of a motor vehicle for example it is estimated that about 75% of the wear on the cylinder walls of the motor takes place when the motor is first started after a period of idleness and before the oil film is reestablished. A solid lubricant tends to remain in place and prevent this wear.

Graphite has heretofore found a limited use as a solid lubricant but it is subject to serious disadvantages. Pure graphite is very difficult to obtain. Native graphite nearly always contains some silica and other materials which are highly abrasive, and artificial graphite normally also contains highly abrasive impurities, although of a different character. To be useful as a solid lubricant a material must be in the form of small particles preferably of colloidal dimensions, and free from abrasives. Most of the substances of the present invention can be made under controlled conditions from readily available materials of high purity, and can consequently be produced free from abrasives. Also they can be produced at relatively low temperatures which favor the formation of small particles. The reduction of the resulting products to the colloidal state is therefore very much easier.

When a beam of X-rays is suitably passed through a solid or powdered crystal, it is broken up into a pattern which is peculiar to, and characteristic of, the substance composing the crystal. On theoretical grounds it is possible to infer from the nature of the pattern formed the relative location and spacing of the atoms of the crystal substance, and calculate the actual distances between atomic centers. With respect to their atomic arrangement as disclosed by X-ray analysis, all substances may be divided into two classes.

One of these classes is the so-called "layer" or "plate" class, the substances of which crystallize in definite layers. They are characterized by the fact that they are "plate forming", that is they separate very easily along certain planes of cleavage all of which, within the same crystal, are parallel. X-ray spectroscopy shows that the atoms of these substances are arranged in plates parallel to the planes of cleavage, and that the principal valences or inter-atomic forces are chiefly satisfied within a plate, while only weak secondary forces act between plates. The atoms within a plate are relatively close together and the configuration thereof follows some regular geometric figure which usually produces a rigid interlocking structure. In a plane normal to the plane of cleavage the atoms are relatively far apart, possibly two or three times as far apart as they are within a plate, and while the arrangement within these planes is also regular, it is characterized by wide empty "lanes" which are several times as wide as the inter-atomic distances within a plate. These inter-plate "lanes" form the planes of cleavage.

In certain substances these elementary plates or layers may be only one atom thick. Such seems to be the case with boron nitride, in which the atoms within a plate are arranged in hexagons which give a rigid inter-locking construction, with atoms of boron and nitrogen alternating at the corners of a hexagon. In a direction at right angles to a plate the atoms are arranged in parallelograms, with greater inter-atomic distances than within a plate.

Another example of layer or plate structure is molybdenum sulphide. In this substance a plate seems to be three atoms thick, consisting of a layer of sulphur atoms, then one of molybdenum atoms, then another of sulphur. Here the unlike atoms are all within a plate while adjacent plates present to each other faces of like atoms only. Also the inter-atomic distances within a plate are considerably less than those between the nearest atoms in adjacent plates. Other examples of substances that crystallize in plates or layers are tungsten sulphide, titanium sulphide, stannic sulphide, zirconium selenide, titanium telluride, lead iodide, and cadmium iodide.

We have discovered that the whole class of "plate forming" chemical compounds, characterized in that they crystallize in plates or layers, when reduced to small particles preferably of colloidal dimensions, make excellent solid lubricants, since they then consist of minute plates whose sides are atomically smooth, and apparently slide over each other with negligible friction. While the foregoing considerations offer what appears to be a logical reason why these substances make good solid lubricants, we do not wish to be bound by this explanation, because the fact remains that according to our discovery these substances do make good solid lubricants, and this is true irrespective of the mechanism that may cause it.

Tests on a Timkin lubricant tester with a standard motor car lubricating oil (S. A. E., viscosity 30) showed a loss of .8 milligram in the weight of the block and cylinder due to abrasion, when operated with 8 pounds on the lever and for 6 hours. The same test with the same oil, to which .2% of colloidal boron nitride was added gave a loss of .4 milligram. A similar test with .2% molybdenum sulphide showed a loss of only .2 milligram. In the case of the molybdenum sulphide the revolving cylinder was coated with a smooth black coating. The loss of weight of the block was actually .3 milligram, while the cylinder gained .1 milligram, making the net loss .2 milligram as noted before. Examination of the cylinder surface under a high power microscope showed it to be much smoother than originally, probably because of the ingrained molybdenum sulphide.

Some of the substances of the present invention, particularly the sulphides, selenides and tellurides, also increase, in varying degree, the film strength of the oil or grease to which they are added. For example, one percent molybdenum sulphide by weight increased the film strength of the same standard motor car lubricating oil (S. A. E. viscosity 30) until loads as high as 80 pounds on the lever arm of the Timken tester were required to break the oil film. This was equivalent to about 40,000 pounds per square inch load on the bearing surface. Without molybdenum sulphide the oil film broke at only 10 pounds on the lever.

Many of the substances of the present invention also have great chemical stability; consequently they do not break up or alter by chemical reaction, or cause corrosion at the temperatures and under the conditions likely to be found in machinery, as in internal combustion engines for example. In the preferred embodiments of the invention the substances are added to mineral oils and greases in the proportion of approximately .05% to 5% by weight, but may be added to vegetable oils or other carriers. Boron nitride being white and lustrous, produces a very pleasing and clean looking lubricant when added to oil, and is particularly adapted to use on textile and food handling machinery. Stannic sulphide being yellow, also produces a lubricant of pleasing appearance and does not materially discolor ordinary light oil when added thereto as does molybdenum sulphide which is black.

From the foregoing description of the invention it will be apparent that not only has a new class of lubricants been produced, but also lubricating properties have been discovered in an entire class of substances which may be added to oils and greases to improve their lubricating qualities.

While the preferred embodiments of the invention have been described, we do not intend to be limited to the specific compounds and lubricants mentioned, but it is our intention to cover any and all variations, adaptations or uses thereof as come within the knowledge and customary practice in the art to which the invention appertains, and we particularly point out and claim as our invention the following:

We claim:

1. A lubricant comprising a lubricating oil or grease and a minor percentage of synthetic molybdenum sulphide substantially free from abrasive material.

2. A lubricant comprising a lubricating oil or grease and synthetic molybdenum sulphide to the extent of .05% to 5% of the whole by weight.

HUGH S. COOPER.
VIVIAN R. DAMERELL.